March 8, 1966

R. OLDENBURGER 3,238,956

HYDRAULIC GOVERNOR MECHANISM HAVING PLURAL
ERROR DETECTING MEANS

Filed Dec. 19, 1962

INVENTOR.
RUFUS OLDENBURGER
BY George M. Soule
ATTORNEY

United States Patent Office 3,238,956
Patented Mar. 8, 1966

3,238,956
HYDRAULIC GOVERNOR MECHANISM HAVING PLURAL ERROR DETECTING MEANS
Rufus Oldenburger, West Lafayette, Ind., assignor to Curtiss-Wright Corporation, a corporation of Delaware
Filed Dec. 19, 1962, Ser. No. 245,775
6 Claims. (Cl. 137—34)

This invention relates to improvements in hydraulic governors (automatic control mechanism) and particularly speed governors for engines and other prime movers.

The principal objects of the invention are essentially the same as those recited in my United States Patent 3,051,138 issued August 28, 1962, to the assignee hereof.

Most hydraulic governors presently in commercial use, in order to operate isochronously and to enable performance responsive to amounts of error or deviation from predetermined or selected values and in response to the rate of change of error or deviation employ some form of dashpot including an adjustable leak-off (needle valve) whereby one of the operating constants can be readily varied. The dashpot pistons are subject to sticking, the operation of the needle valves whose orifices must be of small area vary unpredictably with temperature, and variation of the principal operating constant usually affects adversely other desirably variable operating constants so that optimum adjustability of necessary control parameters is greatly limited.

The present hydraulic governor or control mechanism, in common with that of my said patent, is generally insensitive to viscosity changes in the operation oil by reason of having effectively sharp edged orifices where orifices are required; has all its hydraulic control passage portions subjected to above-atmospheric pressure to avoid foam in the operating oil; is capable of design or adjustment to enable non-linear response such as fast response for large detected errors and slower response for small errors, and adjustment of the usual constants particularly overall governor gain, governor time constant and derivative or rate constant can be independently adjusted over sufficiently wide ranges to enable the governor to be used on a large variety of engines.

The present governor has separate proportionally-responsive and rate-responsive centrifugally acting error detecting units, each including a pilot valve mechanism whose valving elements are arranged for continuous relative rotation to minimize friction. By employing two centrifugally acting error detecting units more power is available to stroke the pilot valves than when only one such error detecting unit is used in the governor as in said patent. Further the two centrifugally acting units can very easily be designed one especially for response to amounts of deviation in speed from set value and the other especially for response to rate of changes of speed on part of the governed machines.

Objects and features of the present invention not referred to above will be explained in connection with the illustrative arrangements shown in the drawing.

In the drawing—

Figure 1:
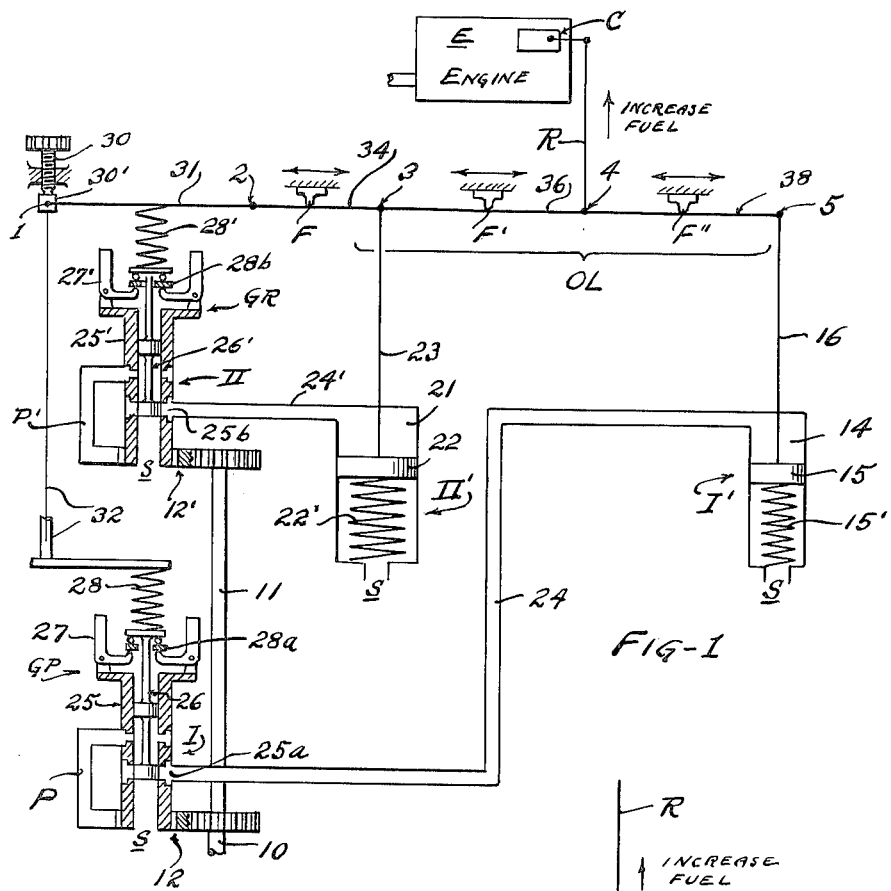
FIG. 1 is a schematic view showing one embodiment of the present governor or control mechanism.

Referring to FIG. 1, the two error (e.g. speed) detecting or measuring units, generally designated GP and GR respectively, are shown as tachometers arranged to be operated by a common governor drive shaft 10 coupled with or driven in synchronism with an engine E via gear couples 12 and 12' having an interconnecting shaft 11 for simultaneous operation of pilot valve units I and II connected hydraulically to control respective servomotors (hereinafter usually servos) I' and II'. The servos as shown are of the spring biased or spring loaded type for simplification of valving and hydraulic circuitry but, as in my said patent, any other suitable types of servos may be used having appropriately modified pilot valves and hydraulic connections. The valve, etc. units I and II would, as installed in a common governor casing (not shown) occupy approximately the same level (i.e., be equally related to sump oil). The connections or passages to sump or negligible pressure regions are indicated S.

Proportionally responsive servo I' has an output piston 15 subjected to pressure in one direction by fluid in pressure chamber 14 against the action of biasing or loading spring 15' and the output acts as through a rod 16 and summation linkage generally designated OL as will be described. Rate-responsive servo II' has its output in the form of a piston 22 with output rod 23 to the summation linkage and has a pressure chamber 21 formed in part by one face of the piston 22, and a biasing or loading spring 22'. The springs 15' and 22' would usually, in actual practice, be located externally of respective cylinders rather than inside as shown.

Pressure oil or other hydraulic fluid can be supplied to the servomechanisms as by pumps constituted in part by the gear couples 12 and 12' as well known in the art. The output lines of the pumps are indicated respectively at P and P'. Control passages 24 and 24' of respective servos I' and II' enter ports 25a and 25b in respective valve sleeves 25 and 25' which for continuous relative rotation of the valve elements can be rotated for example by the gear couples 12 and 12' as will be apparent. The valve sleeves 25 and 25' contain respective pilot valve plungers 26 and 26' which will hereinafter for simplicity usually be referred to as the pilot valves. The pilot valves 26 and 26', during steady state, occupy neutral or centered (equilibrium) positions as illustrated in respect to the valve ports 25a and 25b under the influence of flyballs 27 and 27' driven by the valve sleeves 25 and 25' respectively and opposing forces of speeder springs 28 and 28'. The speeder springs act through antifrictionally mounted thrust plates 28a and 28b of the pilot valve plungers and thereby hold the plungers against being rotated with the valve sleeves. Thus each of the valve plungers during governor operation is substantially free from static friction.

For concurrent and desirably equal adjustment of the two speeder springs 28 and 28' an axially adjustable speeder member 30, indicated as a screw, acts through a suitable connecter swivel 30' at pivot point 1 on a lever 31 extending transversely of and operatingly bearing on the speeder spring 28'; and the screw, through the same pivot point 1, acts on a rigid rod or link 32 a portion of which bears essentially the same relationship to the speeder spring 28 as does the lever 31 to speeder spring 28'.

By properly designed porting as at 25b for operating oil to or from the working chamber 21 of rate servo II' (special porting not shown), considerably more or less piston or output motion per valve opening increment can be had on part of the rate servo II' than would result from the same valve opening increment in pilot valve I for operation of the output servo I'.

Each of the pilot valves can be designed for linear or non-linear operation when desired, as more fully explained in my said patent. The motion of output piston 22 of the rate servo II' results in a nearly immediate return of the pilot valve 26' to neutral or closed position (neglecting inevitable lag), via a floating lever 34 connected to the speeder lever 31 as at pivot 2 and connected to the output rod 23 of the rate servo as at pivot 3. Lever 34 has a normally fixed fulcrum F that is adjustable lengthwise of the lever 34 to enable varying of the governor time or lag constant (Tg in said patent) principally in order to adapt the present governor to engines having different acceleration characteristics.

The output motions of the proportional servo I' and the rate servo II', via their piston-connected rods 16 and 23 respectively, are added algebraically through the linkage OL. The linkage OL comprises, as shown, a lever 36 pivotally connected at 3 to floating lever 34 and to rate servo output rod 23 and a lever 38 connected as at pivot 5 to the output rod 16 of the main or proportional servo I'. Those levers are interconnected as at pivot 4 and to a total governor output rod or link R leading to the engine throttle or rack or an equivalent control element C of the engine E. The rate-servo-connected lever 36 has an adjustable but normally fixed fulcrum F' by which the ratio of movement of output rod 23 of the rate servo II' and its feedback or return motion connection 34, 31 etc. to the tachometer unit GR can be adjusted to vary the derivative constant (or generally rate-responsive) action of the governor (Td in said patent).

Similarly a lever 38 connecting the output rod 16 of proportionally acting servo I' to the total output rod R has a normally fixed but adjustable fulcrum F'' for enabling adjustment of the governor gain constant ($K_2$—see said patent) or the ratio between proportional servo output movement to total engine control movement. Normally fixed fulcrums F' and F'' are designed for adjustment lengthwise of their associated lever elements or as described earlier in reference to fulcrum F of lever 34. Preferably, for negligible effect of each adjustment on the others, the order of making the various adjustments is F(Tg), F'' ($K_2$) and F' (Td).

Various refinements not shown can of course be used. For example any of the various levers 31, 34, 36 and 38 can for increasing their range and to avoid side thrust on associated valves and pistons can be made as double levers as in said patent FIG. 5 thereof. The levers would preferably, so far as possible be in side-by-side or otherwise compact relative arrangement (e.g., as suggested in FIG. 3 of said patent). Further, various modes of operation as for simple isochronous action, isochronous with droop action and the like can be accomplished as in my said patent—inter alia by providing three way valves, not shown, in the communication passages 24 and 24' between the pilot valves and their servos.

The operation of the above described mechanism is essentially exactly the same as in my said patent. This operation (FIG. 1) generally is as follows:

Departure from neutral or closed position on part of pilot valve 26 initiates output movement of proportionally operating servo I' simultaneously with output movement of rate servo II' via operation of pilot valve 26'. The direction of combined output motions via rod R is determined by the direction of detected error—whether positive or negative. During acceleration of the engine for example following a decrease in its loading the fast action of the rate servo II' causes accelerated total output movement of the rod or link R, or faster action than would have occurred solely through operation of the proportional servomechanism of the system (valve 26 and movement of piston 15) so that the amount of speed error or departure from set value will be lessened or minimized. During deceleration of engine speed, following complete or partial fuel correction, the restoring action through operation of rate servo output rod 23 via levers 34 and 31 to reposition the rate pilot valve 26' to closed condition tends, as in the case of dashpot governors, to delay or retard restoration of the engine speed to its set value, thereby to minimize overshoot. Thus the operation of the rate-responsive portions of the present governor mechanism correspond to so called "secondary compensation" or integrating action in a hydraulic governor having some form of dashpot. Set speed is restored finally by the proportionally acting ballhead GP through centering of its pilot valve 26 or movement of it to neutral or off position in one or more steps as in the case of any hydraulic isochronous governor. Operation for increased engine load or equivalent disturbance is exactly the opposite of that described above.

Figure 2:
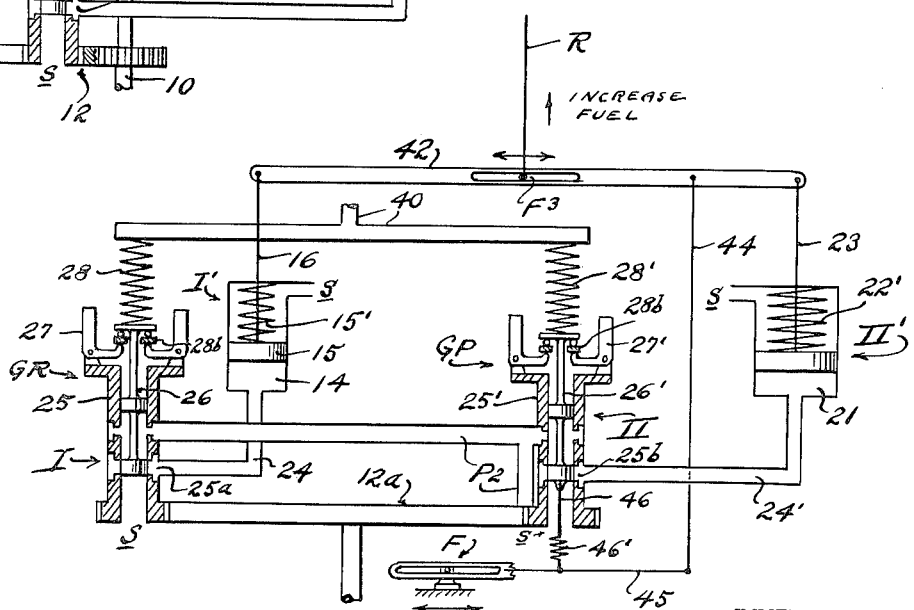
FIG. 2 is a similar schematic view showing, inter alia, an alternate arrangement of output summation linkage.

The arrangement according to FIG. 2 differs from that of FIG. 1 partly in that the governor gain constant ($K_2$) and the derivative or rate constant (Td) are adjusted simultaneously rather than separately, thus somewhat simplifying the construction of the summation linkage, and in that the feedback from the rate servo II' to the rate valve mechanism II acts directly but yieldably on the pilot valve 26' rather than through its speeder spring 28' as in FIG. 1. The tachometer and valve units I and II are preferably of identical design and proportions (except usually for differences in the valve portings).

In FIG. 2 the components corresponding fully to counterparts in FIG. 1 have the same reference characters.

Drive gear 12a operates to turn both valve sleeves 25 and 25' and, as shown, only one of the gear couples (at right) includes a pump with a common pressure outlet P2 to both valve sleeves. The summation linkage has a single rigid lever 42 connected to total output rod or link R and its pivotal connection F3 with the lever 42 is adjustable therealong so as to increase (or decrease) the derivative or rate value as the governor gain constant value is decreased (or increased) which inter-relationship is usually desirable. The feedback linkage 44, 45, 46 and 46' to the rate pilot valve 26' (solely for simplifying illustration) is shown connected for push-pull action to the lower end of the pilot valve 26' which specific arrangement would not usually be suitable in an actual construction or design. Spring 46' in the feedback linkage is relatively weak as compared to speeder spring 28'. The normally fixed fulcrum F for lever 45 is indicated as adjustable lengthwise of lever 45 to vary the governor time constant (Tg).

Except as otherwise indicated above the operation of the governor according to FIG. 2 is identical with that of FIG. 1.

I claim:

1. A hydraulic governor mechanism comprising first and second error-detecting units connected for operation by a single source of signal energy, a first servomechanism comprising a first pilot valve connected for movement by the first detecting unit and a first servo having an output member, the first servo being connected hydraulically for control by fluid pressure solely according to the operation of the said pilot valve as determined by the first detecting unit, a second servomechanism comprising a second pilot valve connected for movement by the second of said detecting units and a second servo hydraulically connected to the second pilot valve and having an output member movable thereby responsive to movements of the second pilot valve, the output member of the second servomechanism having feedback lever means connected for operation to close the second pilot valve automatically in response to movement of the output member of the second servo, mechanical summation linkage connected to add algebraically the movements of said servo output members and an output element connected with the summation likage for actuation thereby to provide an output signal from the governor applicable to the control of an engine or other prime mover.

2. The governor according to claim 1 wherein said linkage includes two mutually interconnected levers and normally fixed fulcrums for respective levers, one of the fulcrums being adjustable lengthwise of its associated lever.

3. The hydraulic governor according to claim 1 wherein the feedback means between the second servo and its associated pilot valve includes a lever having a normally fixed fulcrum which is adjustable lentghwise of the lever.

4. A hydraulic governor comprising two error measuring units, said units including first and second pilot valves connected for actuation by respective error detecting elements of the units, a first servomotor having an output member, the servomotor being connected hydraulically for control by fluid pressure solely according to the operation of the first pilot valve, a second servomotor also having an output member, the second servomotor being hydraulically connected to the second pilot valve for control thereby, feedback lever means between the output member of the second servo and the second pilot valve and operating to close that valve as a function of movement of output member of the second servo, said feedback lever means including a lever member having end portions pivotally interconnecting the output members and a control member pivotally connected to the lever member intermediately of its end portions for algebraic addition of the output movements.

5. The governor according to claim 4 wherein the point of pivotal connection of the control member with the lever member is adjustable along that lever member.

6. The governor according to claim 5 wherein said feedback means further includes means for varying the ratio of feedback movement of the second servo output member to the second pilot valve.

References Cited by the Examiner
UNITED STATES PATENTS

| | | | |
|---|---|---|---|
| 1,976,659 | 10/1934 | Dickinson | 137—26 |
| 2,020,847 | 11/1935 | Mitereff. | |
| 2,657,918 | 11/1953 | Parker | 137—34 X |
| 3,030,931 | 4/1962 | Baxter | 91—387 |
| 3,051,138 | 8/1962 | Oldenburger | 91—366 |

ISADOR WEIL, *Primary Examiner.*

CLARENCE R. GORDON, *Examiner.*